United States Patent Office 3,113,925
Patented Dec. 10, 1963

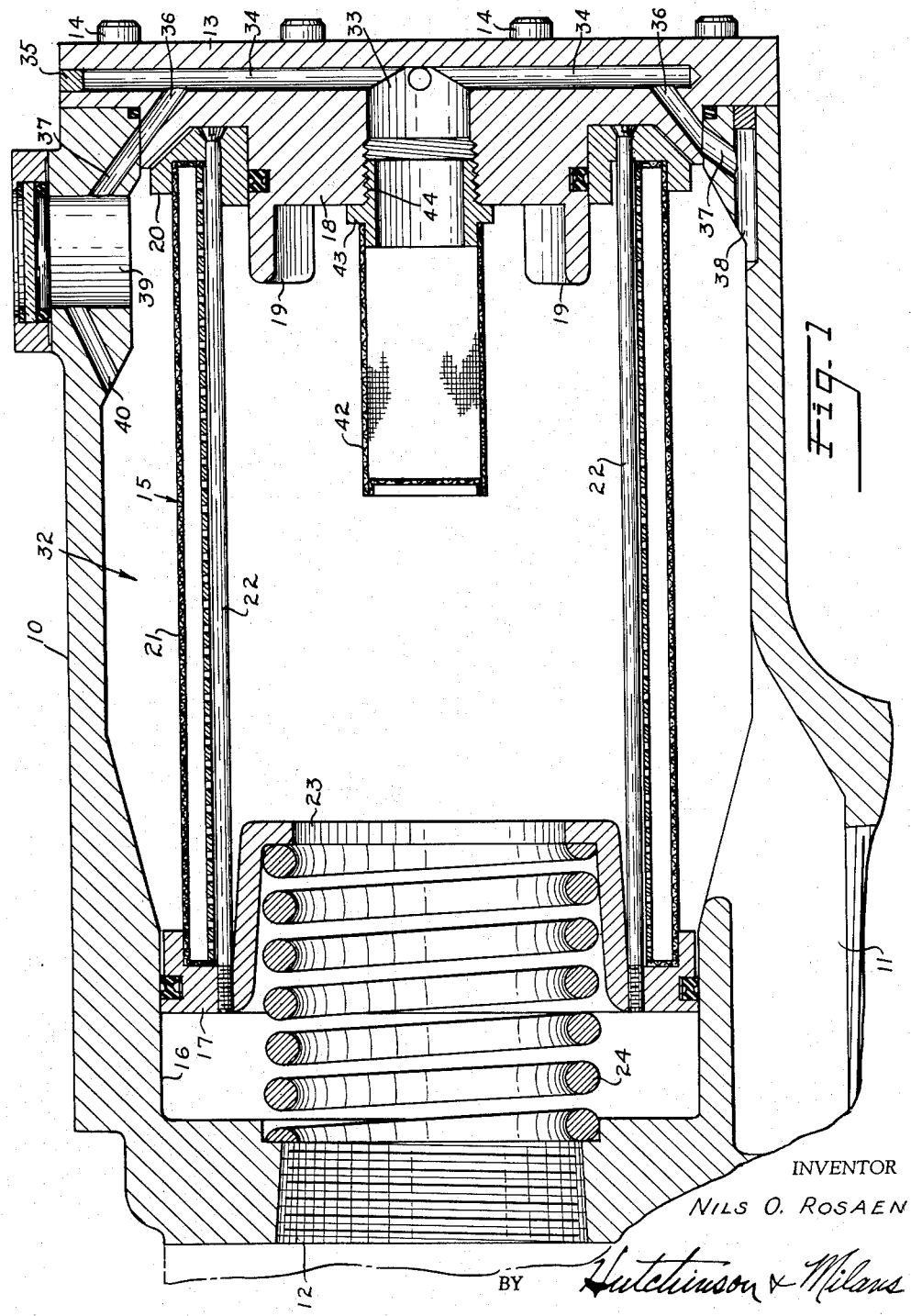

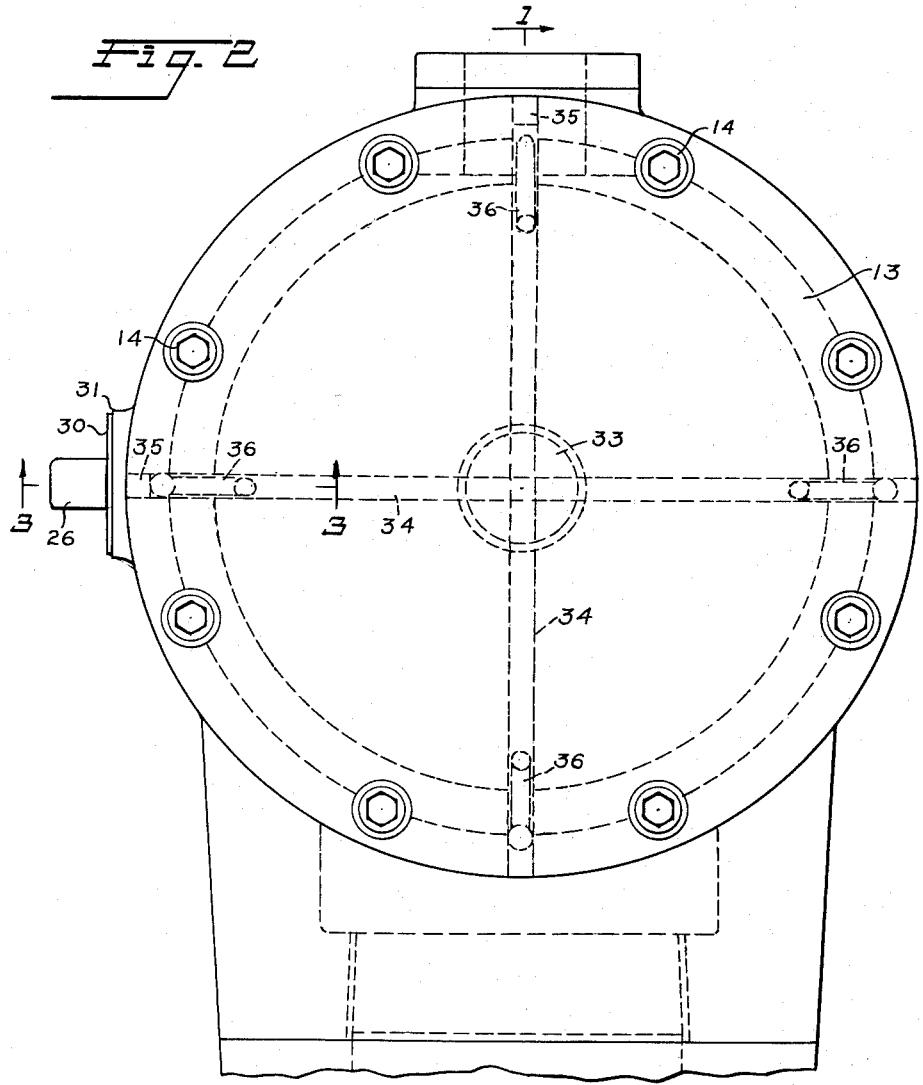
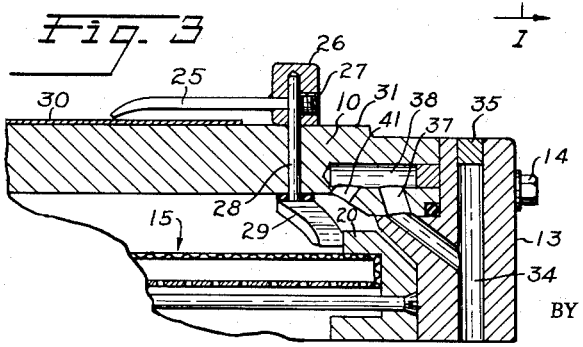

3,113,925
FLUID FILTERS
Nils O. Rosaen, Detroit, Mich., assignor to The Rosaen Filter Company, Hazel Park, Mich., a corporation of Michigan
Filed June 6, 1961, Ser. No. 115,178
4 Claims. (Cl. 210—315)

This invention relates to fluid filters and particularly to improvements in fluid filters of the type used in filtering circulating fluids, such as oil, as commonly used in many hydraulically actuated systems.

Specifically, the invention relates to improvements in fluid filters to prevent entrapment of air within the filter housing during operation of the fluid system and to an efficient air bleed means for the removal of entrapped air under operating conditions.

Fluid filters of the type to which this invention relates are used in many hydraulically actuated systems to remove dirt, grit and the like foreign matter from the fluid of the system, to thus prevent such matter from fouling the pump, valves and other intricate parts of the hydraulic system. Such systems generally employ a fluid pump drawing oil from a source of supply and delivering the same under pressure throughout the fluid system for the operation of suitable component parts thereof, after which the fluid is returned to the source of supply for recirculation by the pump. Filters are generally installed in such systems between the source of supply and the intake to the pump and when so installed are generally referred to as suction filters.

Under various operating conditions in such a hydraulic system, air may be trapped in the upper part of the fluid housing. For example, if the pump in the system is a variable type pump, the filter should necessarily be designed and sized to handle the maximum flow created by the pump. However, where such a pump is operated on sustained low volume, the reduced flow through the filter might well fail to completely fill the filter housing with the fluid. This will result in air being entrapped in the upper portion of the filter housing.

Again, if an oversized filter were inserted in the housing, as is quite often done to postpone the need for cleaning, the pump volume might very well fail to fill the filter housing and air will be entrapped therein.

These and other operating conditions may very well result in air being trapped in the upper part of the fluid filter housing. When this has occurred, during operation of the system, there is always present the danger that the entrapped air will be forcefully driven out of the filter housing in one big mass or "slug" which may well result in material damage to the pump and associated parts of the system, particularly if this condition is frequently repeated.

It is therefore the main object of this invention to provide a fluid filter with an efficient air bleed means to prevent entrapment of air within the filter housing during operation of the fluid system.

It is a further object of the invention to provide air bleed means for a fluid filter housing that is easily fabricated and completely contained within the walls of the housing.

It is an additional object to provide air bleed means for a fluid filter of the suction type which will prevent damage to the pump and associated parts of the system that might otherwise result from large air masses being forcefully discharged from the filter during normal operation.

Another object of the invention is to provide air bleed means which will remove any entrapped air from the upper portion of the filter housing in sufficiently small increments as not to injure the pump and other parts of the system.

A further object of the invention is to provide a fluid filter of the suction type with air bleed means which will keep the housing adequately filled with fluid and continually remove any air that might accumulate in the housing during operation of the system.

Other objects and advantages will be apparent to those skilled in the art upon reference to the following description and the accompanying drawings, in which:

FIG. 1 is a longitudinal sectional view through a filter housing embodying the invention with the section taken on the line 1—1 of FIG. 2;

FIG. 2 is an end elevation of the housing as viewed from the right of FIG. 1; and FIG. 3 is a fragmentary sectional view taken on the line 3—3 of FIG. 2.

Referring to FIG. 1 of the drawings, there is shown a fluid filter of the axially movable cartridge type of the general character embodied in the co-pending patent applications of Oscar E. Rosaen and Nils O. Rosaen, Serial No. 649,059 filed March 28, 1957, now Patent No. 3,053,-389, granted September 11, 1962, and Serial No. 26,046 filed May 2, 1960, which comprises a generally cylindrical housing 10 provided near one end with a laterally disposed fluid inlet 11 and at the same end is provided an axially arranged outlet 12. The other end of the housing is closed by a suitable cover or closure plate 13 removably secured to the housing by suitable bolts 14 whereby said closure plate on removal from the housing affords access to the interior of said housing for the removal and insertion of the filter cartridge generally indicated by the reference character 15.

Inside of the housing and coaxial with the outlet 12 the housing wall is finished to provide a cylinder 16 adapted to receive the cooperating piston-like end cap 17 of the filter cartridge 15. The piston-like cap 17 is in the form of an annulus, that is, it is provided with an opening 23, so that fluid may pass from inside the cartridge therethrough on its way to the outlet 12. At the other end of the housing, closure plate 13 is provided on its inner face with an inwardly extending cylindrical boss 18 which terminates in spaced tongues 19. The boss carried by the closure plate is arranged coaxial with the cylinder 16 and is formed with a smaller diameter than said cylinder and serves as a guide for the flanged cap or ring 20 of the cartridge 15.

A cylindrical screen or other suitable filtering element 21 is carried between its two end caps, piston-like cap 17 and flange cap 20, and the screen and caps are suitably secured together in any desired fashion, such as, by means of bolts 22 passing through cap 20 and threaded into cap 17 as shown. The assembly of filtering element and its two end caps thus constitutes the filter cartridge as it is referred to in the art.

As is customary in fluid filters of this type, the filter cartridge is normally maintained in the position shown in FIG. 1 with the cap ring 20 bearing against the inner face of closure plate 13 with the ring 20 at the base of the boss 18 carried by the closure plate, by means of a coil spring 24 seated between the end face of the cylinder 16 and the adjacent face of the piston-like cap 17.

The spring 24 is selected of a strength sufficient to retain the filter cartridge, when the filter element is clean, in the extreme right-end position of the housing as viewed in FIG. 1. The spring selection will, of course, be based upon the rating of the pump in the particular system in which the filter unit is to be installed, consideration being given to the desired permissible pressure drop between the inlet 11 and the outlet 12 of the filter unit when the pump and system are in desired normal operation.

In the operation of the device, the fluid used in the system is drawn in through the inlet 11 through suction applied by the pump in the line connected to the outlet 12 and said fluid normally flows through the cylindrical screen or filter element 21 to the interior of the filter cartridge and thence through the opening 23 of the piston-like cap 17 to the outlet 12 and on to the intake of the pump. As the screen 21 begins to become clogged with accumulated dirt screened from the fluid and the pressure differential between the inlet and outlet of the housing rises above the selected or predetermined permissible pressure drop, as determined by the selected strength of spring 24, the pressure cartridge begins to move axially of the filter housing to the left, as viewed in FIG. 1, against the resistance of the spring until the flanged ring cap 20 has moved along the boss 18 far enough to expose the spaces between the tongues 19 to the incoming fluid, which will allow at that time fluid to by-pass the screen or filter element 21 and flow directly to the interior of the filter cartridge between the tongues of the boss. By-passing of the fluid is essential as a safety measure to prevent starvation of the hydraulic system and consequent damage to the component parts thereof.

When the filter cartridge becomes dirty and clogged and by-passing occurs, the attendant must promptly change or clean the filter cartridge. This is accomplished by shutting down the hydraulic system, removing bolts 17 and closure plate 13 and axially removing the dirty cartridge from the filter housing.

Indicating means may also be provided exteriorly of the casing for indicating to an attendant the position of the axially movable filter cartridge 15 in the housing and hence the precise condition of said filter element prior to the actual opening of the by-pass means heretofore described, and if such indication goes unheeded by the attendant, then said indicating means will actually indicate the by-passing of the fluid when that condition actually occurs. The indicating means is actuated by means responsive to the movement of the cartridge and involves the subject matter of a separate application for patent.

Briefly, the indicating means, as shown in FIG. 3, comprises an indicating arm or hand 25 carried by the hub 26 which is mounted or fixed by a set screw 27 to a short shaft 28 extending through the wall of the housing and carrying at its inner end a crank arm 29, the upper end of which is positioned to bear against the forward edge of the flanged ring cap 20 of the filter cartridge. The arm or hand 25 upon rotary movement of the shaft 28 will traverse a legend plate 30 carried on the side of the housing and preferably mounted on a plate-like boss 31. The angular relationship of the arm 25 to the crank arm 29 is set so that when the end of the crank arm is bearing against the foreward edge or flange of the ring cap 20 with the filter cartridge in the position shown in FIG. 1, the indicating hand or arm will point to the "Filter is Clean" position on the legend plate 30.

As the filter cartridge 15 moves to the left as viewed in FIG. 1, upon gradual clogging of the filter element 21, as explained above, the flange of the end cap 20 of the cartridge will move the crank arm and hence rotate shaft 28 which will in turn carry the hand 25 downwardly over the legend plate, thus indicating the condition of the filter so that an alert attendant will be prewarned and in a position to change or clean a filter element at the proper time.

Under various conditions of operation of the system employing the filter, as heretofore mentioned, air may very well collect and be trapped in the uppermost portion of the filter chamber indicated generally by the arrow 32. Whenever this occurs, irrespective of the reason for the occurrence, there is ever present the danger that the entire air mass forming the air pocket will be forcefully discharged through the filter unit and on to the pump inlet with the shock of the air "slug" on the pump parts possibly inflicting material damage thereto and to the other parts of the system.

To overcome the forementioned difficulty and possible damage to the system parts, the present invention involves the employment of novel air bleed means for bleeding in small increments the entrapped air from the pocket 32 through passageways formed in the walls of the filter housing and leading directly to the interior of the filter cartridge where the suction of the pump can effectively draw the entrapped air out of the filter housing along with filtered fluid and thus permit the housing to become completely filled with fluid.

To accomplish the intended purpose I have disclosed in the accompanying drawings one preferred embodiment of an air bleed system employing connecting passageways from the uppermost portion of the filter chamber through the walls of the housing and its closure plate and integral boss leading directly to the interior of the filter cartridge.

As seen in the drawings, the boss 18 is preferably bored as at 33 to provide a cylindrical chamber therein axially and concentrically disposed with reference to the boss and filter element 15 and opening into the interior of the latter. The inner end of chamber 33 terminates within the closure plate 13, as shown, and connects with one or more radially disposed passageways 34 drilled in the closure plate at right angles to the axis of the chamber or passageway 33.

While only one passageway 34 may be employed leading to the upper part of the plate, any number of passageways 34 may be drilled through the plate, depending upon a particular disposition of the filter housing in the system and as shown four equally spaced passages radiate outwardly terminating near the outer peripheral edge of the closure plate thus permitting greater adaptability of the filter to various angular installations. Preferably the four channels may be formed in two drilling operations with the end openings of the channels thereafter plugged as at 35.

Passageways 36 are drilled through the closure plate to connect with the passageways 34 and are angularly disposed with reference thereto so that the outer ends of said passageways 36 will register with passageways 37 drilled in the housing walls, when the closure plate is in assembled relation with respect to the housing. Passageways 37 lead directly to the interior of the filter chamber or connect with additional drilled passageways which do lead to the chamber, such as shown at 38, 39 and 40 in FIG. 1 and 38 and 41 in FIG. 3.

The air bleed passageway system is preferably provided with screen means to prohibit coarse particles of foreign matter from entering the interior of the filter cartridge. As shown, a cylindrical air vent screen 42, closed by screening at its outer end, is mounted on a bushing or sleeve 43, which is in turn threadedly received, as at 44, within the outer end of the chamber 33 in the boss 18. The air vent screen is selected to have a more open meshwork than that provided by the filter element 15, so as not to hinder the efficient functioning of the air bleed system.

The actual diameter of the interconnected passageways forming the air bleed system from the filter chamber to the chamber 33 in the boss may be somewhat exaggerated in the drawing for purposes of illustration. However, in actual practice it is found that a diameter size of aproximately ⅛ inch will be adequate for a suction type filter handling from 75 to 150 gallons per minute.

In installing the filter in the system, the housing should preferably be disposed in the manner shown in the drawings, but, nevertheless, it could be disposed in any angular disposition of the housing so long as one of the passageways 34 is vertically positioned to lead to and connect with the uppermost part of the housing.

When the system is functioning with the housing positioned as shown in the drawings, any air that might collect at 32 and 39 in the upper part of the housing will be effectively drawn through passageways 40—39—37—

36—34 to chamber 33 and through the screen 42 to the interior of the filter element and hence out through the opening 23 in the piston 17 to the outlet 12 of the filter from when it passes directly to the intake or suction side of the pump in the system. As the air is extracted in small increments, it will pass along to the pump intake with no shock being experienced to the pump or system parts.

While the present invention has been explained and described with reference to specific embodiments of structure, it will be understood, nevertheless, that numerous modifications and variations are susceptible of being incorporated without departure from the essential spirit or scope thereof.

Accordingly, it is not intended for an understanding of this invention to be limited by the foregoing description nor by the illustrations in the annexed drawing, except as indicated in the hereinafter appended claims.

I claim:

1. A fluid filter of the suction type for installation in a hydraulic system comprising a housing having a chamber therein, an inlet and an outlet in said housing for passage of fluid to be filtered through said chamber, said outlet being disposed at one end of said housing, a cylindrical filter element positioned within said chamber with its cylindrical side wall spaced from the housing walls defining said chamber, a cylindrical guiding surface formed in said housing about said outlet for receiving and supporting one end of said filter element and cooperating with said element to provide open communication between the interior of said filter element and said outlet, a closure plate closing the other end of said housing and provided with an internal boss axially disposed with reference to said cylindrical guiding surface and said element with the end of said boss entering the other end of said filter element to guidingly receive and support said other end of said filter element and a passageway formed in the housing wall and through said closure plate and said boss connecting the upper portion of said chamber to the interior of said filter element for bleeding air from said upper portion by the suction created by the fluid pump of the system.

2. A fluid filter constructed as recited in claim 1 wherein the passageway in said boss is axially disposed with reference to said filter element and said passageway in said closure plate is radially disposed with reference thereto and connects at its outer end with a passageway formed in the housing wall opening into the upper part of said chamber.

3. A fluid filter constructed as recited in claim 1 in which the passageway through said boss is provided with a screen at its outlet end to screen foreign matter from entering the interior of said filter element.

4. A fluid filter of the suction type for installation in a hydraulic system comprising a housing having a chamber therein, an inlet and an outlet in said housing for passage of fluid to be filtered through said chamber, said outlet being disposed at one end of said housing, a cylindrical filter element positioned within said chamber with its cylindrical side wall spaced from the housing walls defining said chamber, a cylindrical guiding surface formed in said housing about said outlet for receiving and supporting one end of said filter element and cooperating with said element to provide open communication between the interior of said filter element and said outlet, a closure plate closing the other end of said housing and provided with an internal boss axially disposed with reference to said cylindrical guiding surface and said element with the end of said boss entering the other end of said filter element to guidingly receive and support said other end of said filter element and a passageway axially disposed through said boss and connecting to a plurality of radially disposed passageways formed in said closure plate, each of which last-mentioned passageways connects at its outer end to a passageway formed in the housing wall leading to an outer portion of said chamber for bleeding air from said outer portion by the suction created by the fluid pump of the system.

References Cited in the file of this patent

UNITED STATES PATENTS

| | | |
|---|---|---|
| 723,556 | Stewart | Mar. 24, 1903 |
| 1,506,967 | Bosworth | Sept. 2, 1924 |
| 2,007,336 | Malivert | July 9, 1935 |
| 2,562,361 | Kasten | July 31, 1951 |
| 2,804,211 | Kennedy | Aug. 27, 1957 |